United States Patent

[11] 3,604,926

| [72] | Inventor | Richard Stuart Nelson<br>Goring-on-Thames, England |
| --- | --- | --- |
| [21] | Appl. No. | 689,659 |
| [22] | Filed | Dec. 11, 1967 |
| [45] | Patented | Sept. 14, 1971 |
| [73] | Assignee | United Kingdom Atomic Energy Authority<br>London, England |
| [32] | Priority | Dec. 14, 1966 |
| [33] | | Great Britain |
| [31] | | 56,081/66 |

[54] MAGNIFYING DEVICES FOR OBSERVING CRYSTAL LATTICE STRUCTURES
1 Claim, 2 Drawing Figs.

[52] U.S. Cl. .................................................. 250/49.5

[51] Int. Cl. .................................................. H01j 37/26
[50] Field of Search ........................................... 250/49.5

[56] References Cited
UNITED STATES PATENTS

| 2,453,412 | 11/1948 | Davidson | 250/49.5 (1) |
| 3,277,297 | 10/1966 | Forrester et al. | 250/49.5 (5) |
| 3,370,167 | 2/1968 | Sterk | 250/51.5 X |

*Primary Examiner*—Archie R. Borchelt
*Attorney*—Larson and Taylor

ABSTRACT: A collimated beam of protons is directed at an area on the surface of a specimen and the backscattered protons are used to produce a magnified image of the area. The image may be produced by arranging a fluorescent screen in the path of the scattered protons.

PATENTED SEP 14 1971

3,604,926

MAGNIFYING DEVICES FOR OBSERVING CRYSTAL LATTICE STRUCTURES

BACKGROUND OF THE INVENTION

This invention relates to magnifying devices.

Various types of basically nonoptical magnifying devices are known, of which the electron microscope is probably the one in most common use. Although permitting very large magnifications the electron microscope is not of universal application, mainly because the specimen to be examined must be in the form of a thin section. In addition, electron microscopes are very expensive.

For many crystallographic studies X-ray diffraction methods of examination have been preferred, although these methods have the disadvantages of the radiation hazard associated with the X-rays, and the fact that there is a time delay inherent in the need to translate an X-ray image into some visible form.

It is therefore an object of the present invention to provide a new or improved magnifying device which avoids or overcomes some at least of the disadvantages of the prior devices.

SUMMARY OF THE INVENTION

According to the present invention, a magnifying device comprises an enclosure which during operation is arranged to be maintained at a low pressure, means to mount a specimen to be examined within the enclosure, means to direct a collimated beam of protons at the surface of the specimen and means to render visible the image of the specimen resulting from protons scattered from the specimen.

Preferably, but not essentially, the image is rendered immediately visible by the provision of a fluorescent screen within the enclosure, the scattered protons resulting in a visible image on the screen. This arrangement is of particular convenience where, it is desired to orientate the crystal specimen in a particular direction for the purpose, say, of a subsequent channelling experiment. With the visible image on the screen the crystal can quickly be set to the desired orientation whilst viewing the image. A photographic plate could, however, be substituted for the fluorescent screen.

Best results are obtained when the screen is parallel to the surface of the specimen. The spacing may be about 1.5 cms. depending on the degree of magnification required. The energy of the protons may be in the range 10 kev. upwards, and is preferably in the range 25 to 50 kev.

BRIEF DESCRIPTION OF THE DRAWINGS

A magnifying device in accordance with the present invention will now be described by way of example with reference to the accompanying drawing, in which.

DESCRIPTION OF THE PREFERRED EMBODIMENT

Figure 1:
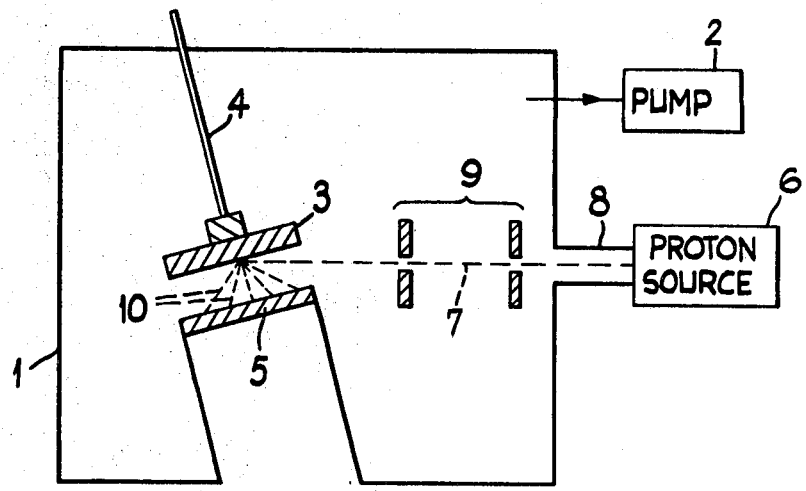
FIG. 1 shows the device diagrammatically.

Referring to FIG. 1, the device comprises an enclosure 1 which during operation is arranged to be maintained at a pressure of $10^{-3}$ mm. of mercury or less by a pump 2. A pressure of $10^{-4}$ mm. of mercury is a convenient working pressure. The crystal specimen 3 is mounted within the enclosure 1 on a suitable support 4 which enables it to be manipulated from outside the enclosure 1. The support 4 may be a goniometer head.

Mounted generally parallel to the surface of the specimen 3 to be examined is a circular glass screen 5 some 4 cms. in diameter which is coated on the side nearer the specimen 3 with a power which fluoresces under proton irradiation. Preferably the screen 5 forms part of a wall of the enclosure 1. The screen may be about 1.5 cm. from the specimen 3 and if variable magnification is required the screen may be mounted adjustably so that it may be moved near to or further from the specimen.

Outside the enclosure 1 is a proton source 6 which supplies a 1 microamp proton beam 7 of energy 50 kev. by way of beam tube 8 and a collimator 9 of aperture 1 mm. or less to the surface of the specimen 3. The beam is directed at a fairly small angle of incidence to the surface of the specimen 3 so as to avoid the screen 5. Protons 10 are scattered back from the specimen 3 from depths of up to about 2,000° A. and the scattered protons 10 which strike the screen 5 result in an enlarged visible image representing a portion of the crystal lattice structure of the specimen 3.

The angle at which the protons are incident upon the screen is immaterial and may be varied to suit the mechanical layout. At larger angles of incidence it may be convenient to mount the fluorescent screen within the enclosure 1 and to direct the beam through a hole in the screen. In this case the screen is preferably viewed through an optical system including a prism or mirror.

Figure 2:
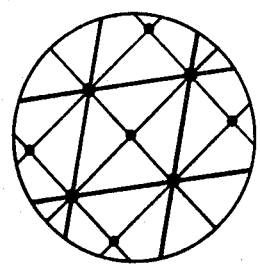
FIG. 2 is a representation of an image obtained with the device of FIG. 1.

FIG. 2 to which reference is now made, is a representation of an actual photograph of the screen 5 obtained when the specimen 3 was a single crystal of tungsten oriented so that a 110 direction in the crystal lattice was perpendicular to the surface of the crystal on which the proton beam 7 was incident. The lines and dots represent the blocking pattern which results from the isotropic scattering of protons blocked in certain directions by close-packed rows and planes of atoms, and is characteristic of the form of the crystal lattice and of its orientation.

I claim:

1. An apparatus for studying the lattice structure at the surface of a crystal wherein the crystal is mounted within an enclosure, which, during operation, is maintained at low pressure, wherein means are provided for directing a collimated beam of protons at the crystal structure, and wherein a fluorescent screen is provided for rendering visible protons backscattered from the crystal, said protons in the collimated beam being low energy protons of energy in the region of 25 kev. to 50 kev.